US009342522B2

(12) United States Patent
Görmer

(10) Patent No.: US 9,342,522 B2
(45) Date of Patent: May 17, 2016

(54) COMPUTER IMPLEMENTED SYSTEM FOR ANALYZING A SCREEN-BASED USER SESSION OF A PROCESS IN A NETWORK ENVIRONMENT

(75) Inventor: Andreas Görmer, Otzberg (DE)

(73) Assignee: SOFTWARE AG, Darmstadt (DE)

( * ) Notice: Subject to any disclaimer, the term of this patent is extended or adjusted under 35 U.S.C. 154(b) by 608 days.

(21) Appl. No.: 13/340,034

(22) Filed: Dec. 29, 2011

(65) Prior Publication Data
US 2013/0166728 A1  Jun. 27, 2013

(30) Foreign Application Priority Data

Dec. 23, 2011 (EP) .................................... 11195596

(51) Int. Cl.
*G06F 15/173* (2006.01)
*G06F 17/30* (2006.01)

(52) U.S. Cl.
CPC ................................ *G06F 17/30067* (2013.01)

(58) Field of Classification Search
CPC .......................... H04L 29/06; G06F 17/30067
USPC ......... 717/168, 113, 170, 172, 139, 109, 106, 717/111, 114, 115, 167, 122; 709/224
See application file for complete search history.

(56) References Cited

U.S. PATENT DOCUMENTS

| | | | |
|---|---|---|---|
| 6,412,106 B1 | 6/2002 | Leask et al. | |
| 6,658,650 B1 | 12/2003 | Bates | |
| 6,785,884 B1 | 8/2004 | Rieschl | |
| 7,055,140 B2 | 5/2006 | Bystricky et al. | |
| 7,111,281 B2 | 9/2006 | Bates et al. | |
| 7,316,003 B1 * | 1/2008 | Dulepet et al. | 717/111 |
| 7,401,323 B2 | 7/2008 | Stall et al. | |
| 8,640,105 B2 | 1/2014 | Yaffe et al. | |
| 2002/0087948 A1 | 7/2002 | Dzoba | |
| 2003/0051228 A1 * | 3/2003 | Martinez et al. | 717/109 |
| 2004/0128655 A1 | 7/2004 | Bates et al. | |
| 2004/0210876 A1 | 10/2004 | Stall et al. | |
| 2005/0066312 A1 | 3/2005 | Barsness et al. | |
| 2006/0288332 A1 | 12/2006 | Sagar et al. | |

(Continued)

FOREIGN PATENT DOCUMENTS

WO    WO 2006/127430    11/2006

OTHER PUBLICATIONS

Search Report issued Apr. 30, 2012 in corresponding European Application No. 11195596.

(Continued)

*Primary Examiner* — Hassan Kizou
*Assistant Examiner* — Abdelnabi Musa
(74) *Attorney, Agent, or Firm* — Nixon & Vanderhye P.C.

(57) ABSTRACT

The invention relates to a computer-implemented system for analyzing an instance of a process in a network environment, wherein the instance of the process includes a screen-based user session (1000), the system including a screen process extractor (1005) adapted to extract during runtime of the instance of the process at least a part of the screen-based user session (1000) and to store it in a recording repository (1030), a source code repository (1050) adapted to store at least a part of the source code underlying the process corresponding at least in part to the instance of the process, and a mapping unit for mapping at least a part of the stored screen-based user session (1000) to the source code.

13 Claims, 10 Drawing Sheets

(56) References Cited

U.S. PATENT DOCUMENTS

Figure 1:
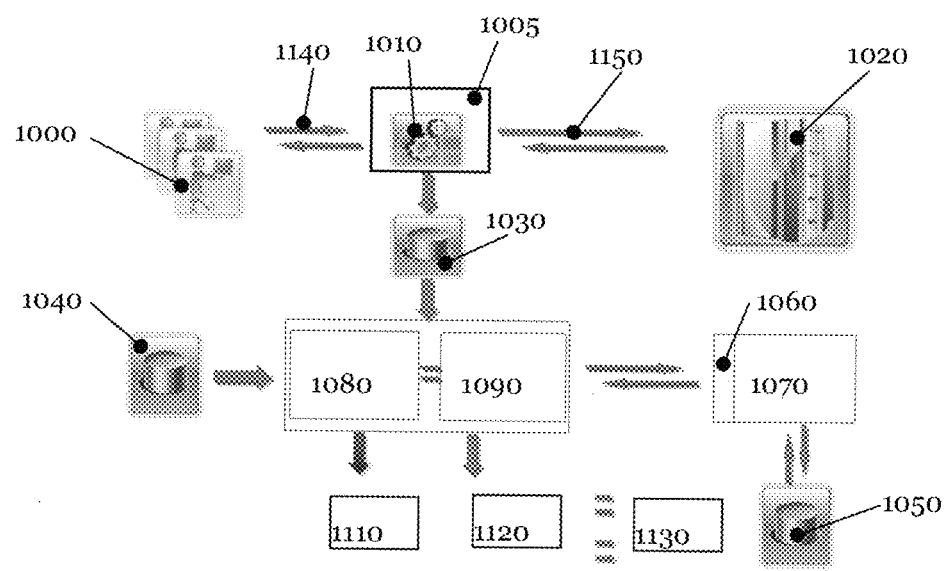

| | | | |
|---|---|---|---|
| 2007/0100994 A1* | 5/2007 | Armstrong et al. | 709/224 |
| 2007/0283330 A1 | 12/2007 | Bates | |
| 2008/0235660 A1* | 9/2008 | Chapman et al. | 717/113 |
| 2008/0244522 A1* | 10/2008 | Bernin | 717/122 |
| 2009/0089742 A1 | 4/2009 | Nagulu et al. | |
| 2009/0183142 A1 | 7/2009 | Hoban et al. | |
| 2010/0153929 A1* | 6/2010 | Porras et al. | 717/139 |
| 2010/0211929 A1* | 8/2010 | Naccache et al. | 717/113 |
| 2010/0235815 A1 | 9/2010 | Maybee et al. | |
| 2012/0084758 A1 | 4/2012 | Bates | |
| 2012/0167056 A1 | 6/2012 | Brunswig et al. | |
| 2012/0204143 A1* | 8/2012 | Fox et al. | 717/113 |
| 2013/0019229 A1* | 1/2013 | Bohlmann et al. | 717/139 |
| 2013/0091493 A1* | 4/2013 | Sowerby et al. | 717/125 |

OTHER PUBLICATIONS

Ying Huang et al., "A Methodology for Test Suit Reduction in User-Session-Based Testing," Department of Computer Science & Engineering, 2010 IEEE Fifth International Conference, Sep. 23, 2010, pp. 864-868.

Netzahualcoyotl Ornelas et al., "VPIN: User-Session Knowledge Base for Self-Management of Ambient Networks," Second International Conference on Mobile Ubiquitous Computing, Systems, Services and Technologies, Sep. 29, 2008, pp. 122-127.

"Map Editor", Natural Version 3.1.1, http://inside.courts.wa.gov, retrieved Dec. 27, 2011, 39 pages.

"How MFS formats input messages", IMS Version 11, http://publib.boulder.ibm.com, retrieved Dec. 27, 2011, 2 pages.

Applinx Legacy Integration Suite. A Technical Overview White Paper. www.sabratec.com, Apr. 7, 2011.

Gantner et al. "Debugging RPG IV Programs—The WDSC Way", [Online]—http://www.ibmsystemsmag.com/ibmi/enewsletterexclusive/18995p2.aspx, Jan. 2008, 5 pages.

Regelson et al. "Debugging Practices for Complex Legacy Software Systems", International Conference on Software Maintenance, Sep. 1994, pp. 137-143, retrieved from the internet on Sep. 11, 2013 URL<http://ieeexplore.ieee.org/stamp/stamp.jsp?tp=&arnumber=336781>.

Systeminetwork, "STRDGB Can Be GUI" Article ID: 20545, http://systeminetwork.com/article/strdbg-can-be-gui, Feb. 24, 2005, 3 pages.

Geyer et al. "Supporting Acitivity-centric Collaboration Through Peer-to-Peer Shared Objects". Proceedings of the 2003 International ACM SIGGROUP Conference on Supporting Group Work, pp. 115-124, 2003, URL<http://dl.acm.org/citation.cfm?id=958179>.

Office Action for U.S. Appl. No. 12/929,538 mailed May 23, 2013.

Notice of Allowance for U.S. Appl. No. 12/929,538 mailed Sep. 20, 2013.

* cited by examiner

COMPUTER IMPLEMENTED SYSTEM FOR ANALYZING A SCREEN-BASED USER SESSION OF A PROCESS IN A NETWORK ENVIRONMENT

This application claims priority to EP 11 195 596.9 filed 23 Dec. 2011, the entire contents of each of which are hereby incorporated by reference.

1. TECHNICAL FIELD

The present invention relates to a computer-implemented system and a method for analyzing an instance of a process.

2. TECHNICAL BACKGROUND

Nearly all processes or workflows in an enterprise environment (e.g., manufacturing processes) are rather complex. For example the assembly of a car requires a precise coordination of a multitude of manufacturing steps. Individual parts (e.g., the car wings, the motor or the mirrors) are typically produced at different locations wherein the production of each part requires in turn a complex assembly. The parts are then shipped to another location where the final assembly of the car takes place. The overall process comprises not only manufacturing steps but also other essential actions such as ordering of raw materials and pre-fabricated components as well as logistical tasks like managing stock or even the preparation of invoices.

Over the years, information technology has become indispensable for the control of such complex processes. A particularly well-known and powerful tool for analyzing and modeling industrial processes is ARIS (Architecture of Integrated Information Systems) of applicant.

However, it turns out that the representation of a real world process by a software process alone is in many cases insufficient without the possibility to flexibly adapt the software process. A process may have to be modified for several reasons. For instance, a technical advance or change of design may require different steps or a change of a sequence of certain steps. Also, certain rules underlying steps of a process may have to be changed. Moreover, errors could occur which might result in a mis-configured, incomplete or even insecure product. Such errors may be detected by supervising instances of a process. For example, a technical analyst may monitor multiple instances of a car assembly in an assembly line and identify several related problems.

In this case, the analyst may want to modify the real world process, rules underlying the process and its representation in the controlling IT process by adding, modifying or correcting one or more steps. This requires an adaptation of the respective source code. Thus, the analyst must provide a competent software engineer with a detailed description of the problem(s) enabling the software engineer to modify the source code.

In this regard, the US patent application publication 2007/0100994 A1 discloses the modeling of interactions with a computer system. It describes a method for identifying one or more states encountered during an interaction session based on collected information and the step of generating a trace of the interaction session based on the states encountered during the interaction session.

However, even if such states, traces or other details are provided, the analyst does not know the exact part of the source code, e.g., belonging to a certain rule which has to be modified. This problem could even increase if the software is distributed over several host computers. As a result, the software engineer may misunderstand the analyst and modify the source code in a different manner than intended by the analyst so that the resulting process is even less capable to correct the controlled workflow.

It is therefore the technical problem underlying the present invention to overcome these disadvantages at least in part, i.e., to improve the identification of problems of a process such that they can be solved in a more efficient, safer and more reliable manner compared to the prior art.

3. SUMMARY OF THE INVENTION

In one embodiment of the invention this problem is solved by a computer-implemented system for analyzing an instance of a process in a network environment, wherein the instance of the process comprises a screen-based user session and wherein the system comprises:

a. a screen process extractor adapted to extract during runtime of the instance of the process at least a part of the screen-based user session and to store it in a recording repository;
b. a source code repository adapted to store at least a part of the source code underlying the process corresponding at least in part to the instance of the process; and
c. a mapping unit for mapping at least a part of the stored screen-based user session to the source code.

In the described embodiment the screen process extractor identifies one or more screens presented to a user during execution of the instance of the process which is executed using a legacy system and stores them to the recording repository. The two repositories, one for the extracted user session and one for the source code enable the mapping unit to create the missing link between the screens of the instance of the process and at least a part of the source code. The mapped source code could, e.g., correspond to the rules and/or program logic of a legacy application.

As a result, it is possible to correlate screens (or parts and/or contents thereof) of the screen-based user session (e.g., certain input fields or functions relating to such input field) to the corresponding source code. The mapping could comprise the mapping to specific lines of code representing a screen or part thereof. However, the term source code as used herein does not only mean the actual lines of code, but also comprises the underlying rules/functions or identifiers thereof. Thereby it is possible to identify certain rules underlying a screen or a part thereof. In case of a necessary modification, the analyst can then easily provide the software engineer with the exact location of the relevant portion of source code, e.g., an indication of specific lines of source code, but also the name and/or location of the rule and/or program and/or sub-program and/or function. As a consequence, the software engineer may reliably adjust the correct portion of source code and does not run the risk of overlooking code or adjusting the wrong parts of the source code. The described embodiment of the invention thus increases the safety of modifications to the source code.

In an exemplary embodiment, the computer-implemented system further comprises a query unit adapted to identify source code corresponding to a specific part of the stored screen-based user session, wherein the query unit uses data provided by the mapping unit.

The query unit provides an interface for the analyst or the software engineer to easily retrieve the relevant portion of source code (e.g., the name of a rule, program or sub-program) corresponding to a part of the screen-based user session. This could be done after the analyst determined which process, rule or program logic should be changed or after the analyst has identified problematic steps of the process. The analyst does not have to manually scan the mapped parts of the instance of the process and the corresponding source code but could gain the results by a simple query using the query unit. It is also possible to combine several queries, e.g., by logical operators such as logical AND, OR or exclusive OR.

Preferably, the computer-implemented system further comprises storing the results of the query in a repository to retrieve the results at a later point in time. The stored results could be used for creating statistics, e.g., whether certain parts of one or more instances of the process were correctly carried out or not. Thus, storing the results in the database provides an even better control of the respective process.

Preferably, in the computer-implemented system the source code is identified by a pointer to and/or an indication of the name of a function in the source code.

Displaying or indicating the full source code determined by the mapping and/or as a result of the query may require a lot of space and may be confusing. It does not necessarily provide the analyst or the software engineer with the essential information he needs to know. Thus, merely indicating a pointer to the source code or another indication suitable for identifying parts of the source code facilitates changes to the process. As an example, the name of a function underlying a certain part of the screen, e.g., an input field, is sufficient for determining the part of source code that is to be modified. Furthermore, pointers or other indicators typically require less memory. This could also accelerate database queries as mentioned above.

In one embodiment the computer-implemented system further comprises a detection module adapted to detect additional screens using source code that was mapped by the mapping unit but which was not used during the execution of the instance of the process.

While a specific part of a function or a rule used by the process can easily be identified by the advantageous approach of the present invention, such function or rule (i.e. a portion of source code) may also be used by other parts of the same or even another process. For instance, a certain input field may be used on different screens of the same or another process. If so, the analyst and the software engineer should know about other parts of the process of even other processes which also use that portion of source code. This knowledge makes changes to the source code safer, more consistent and more reliable.

In another exemplary embodiment, the screen process extractor comprises a proxy adapted to monitor at least some of the data exchanged between the screen-based user session and a legacy application on a host computer system.

Usually, instances of processes are executed on a client computer remotely located to a host computer running the legacy application. The client computer and the host computer may be connected by a network connection, e.g., using the telnet protocol or any other suitable communications protocol known to the person skilled in the art. The proxy monitors at least some of the data transmitted between the involved entities and assures that no data relevant to the supervision and/or modification of a part of the process is lost or overlooked. All of these or only parts of these data may then be extracted by the screen process extractor.

It is particularly preferred that the monitored data is further linked with connection information and/or a time stamp.

Typically, the process is repeated many times (e.g., in short time intervals), i.e., there are many instances of the process. By linking the monitored information with such additional information, the analyst and/or the software engineer are provided with further information allowing them to identify critical processes and any related problems.

In an exemplary embodiment, the mapping is executed after the execution of the instance of the process has finished.

As mentioned above, such processes are usually repeated many times and not only once. In order to be able to identify problems it is advantageous to have sufficient statistics (i.e., a sufficiently large number of instances of the process) to be able to identify common problems.

If the mapping is performed permanently and during runtime, this could result in additional overhead due to additional processing time and/or excessive memory needs. According to this preferred feature, the analyst and/or software engineer could initiate the mapping only when necessary.

Further, during execution of the instance of the process, problems may not be known yet or the analysis is performed only sporadically. Consequently, the analyst must be able to analyze the instance of the process after it has finished.

It is also preferred that the computer-implemented system further comprises a display unit adapted to display the results of the query, wherein the displayed results comprise at least a part of the screen-based user session and at least a part of the corresponding source code underlying the screen-based user session.

This allows to simultaneously display the extracted screen (e.g., comprising certain rules defining the process or input fields) and the corresponding parts of the source code. This could be realized, e.g., by dividing the screen horizontally or vertically. This may improve the understanding of the whole process as such, the screen and the corresponding portion of the source code.

Preferably, the computer-implemented system further comprises a process repository containing the process at least in part and a determination module being adapted to determine a discrepancy between the process and the instance of the process as extracted by the screen process extractor.

Identifying differences between the process and the instance of the process as actually carried out can be very difficult, particularly for very complex tasks, which could even be distributed over multiple systems. Therefore, functionality for determining such discrepancies, preferably automatically, will simplify this task and therefore allow for a more reliable and safe identification of differences and corresponding portions of underlying source code. This improves a subsequent modification of the process such that it complies, e.g., with the required policies.

It is particularly preferred that the determination module is further adapted to determine when a part of the source code underlying the screen-based user session as extracted by the screen process extractor was changed for the last time.

This aspect could be particularly relevant for quality assurance of the legacy system which runs the process. For instance, when parts of a certain process have been modified, this may result in different behavior of the process and instances of the process. When the effects of a modification are to be determined, it may help to know when the process has been modified and whether it has been modified in view of the present assessment of the instance of the process (e.g., whether the change has been made two weeks or ten minutes ago).

Preferably, the screen process extractor is further adapted to extract an order in which keys were pressed and parts of screens were displayed during runtime of the instance of the process.

Sometimes it is not only necessary to merely identify the respective parts of the source code relating to some part of the screen and its fields (e.g., the implementation of a certain rule), but also how the user reached that screen and how the user departed from that screen. For instance, there could be some problems in the definition of the process resulting in a wrong link between two screens or a false query. The analyst and the software engineer may therefore need to know how the user acted and which parts of the source code relate to the screens. They may also want to know details about the link between the screens. In this way, the execution of the instance of the process could be improved and made more efficient and safe.

The invention also discloses a method for analyzing an instance of a process in a network environment, wherein the instance of the process comprises a screen-based user session, and wherein the method comprises the following steps:

a. extracting during runtime of the instance of the process at least a part of the screen-based user session and storing it in a recording repository;

b. storing at least a part of the source code underlying the process corresponding at least in part to the instance of the process in a source code repository;

c. mapping the stored screen-based user session to the source code.

The invention further discloses a computer readable medium embodying machine executable instructions for causing at least one computer to perform a method in accordance with any of the embodiments described herein.

4. SHORT DESCRIPTION OF THE FIGURES

Figure 2:
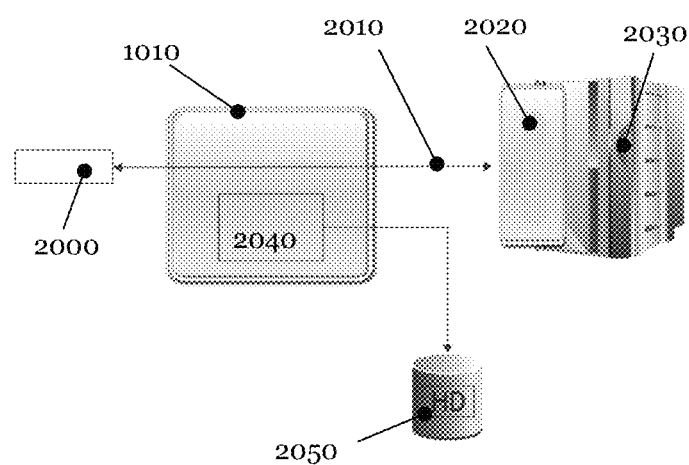
Figure 3:
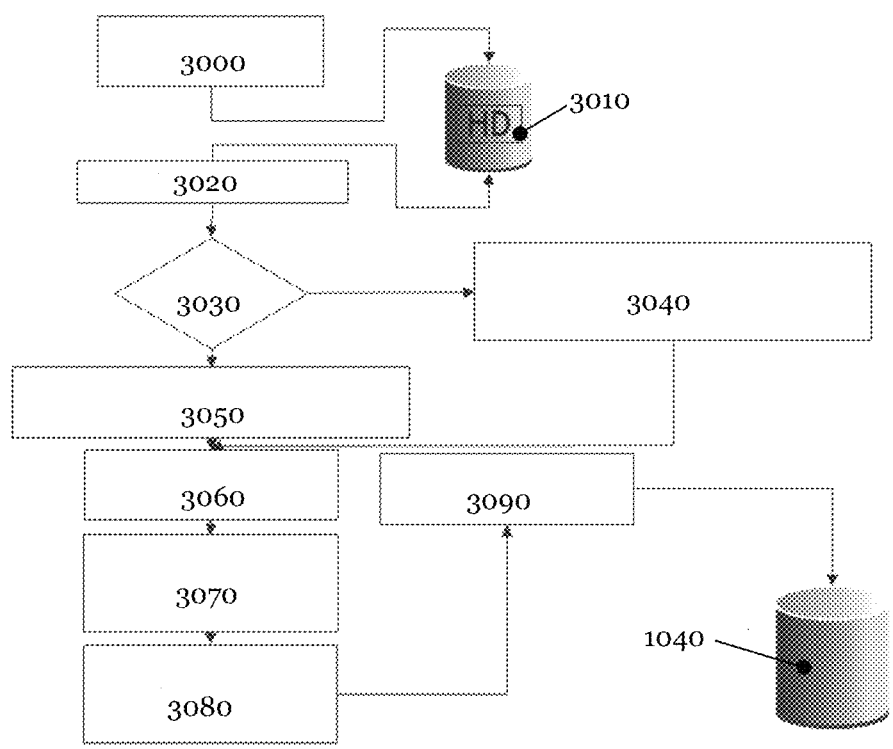
Figure 4:
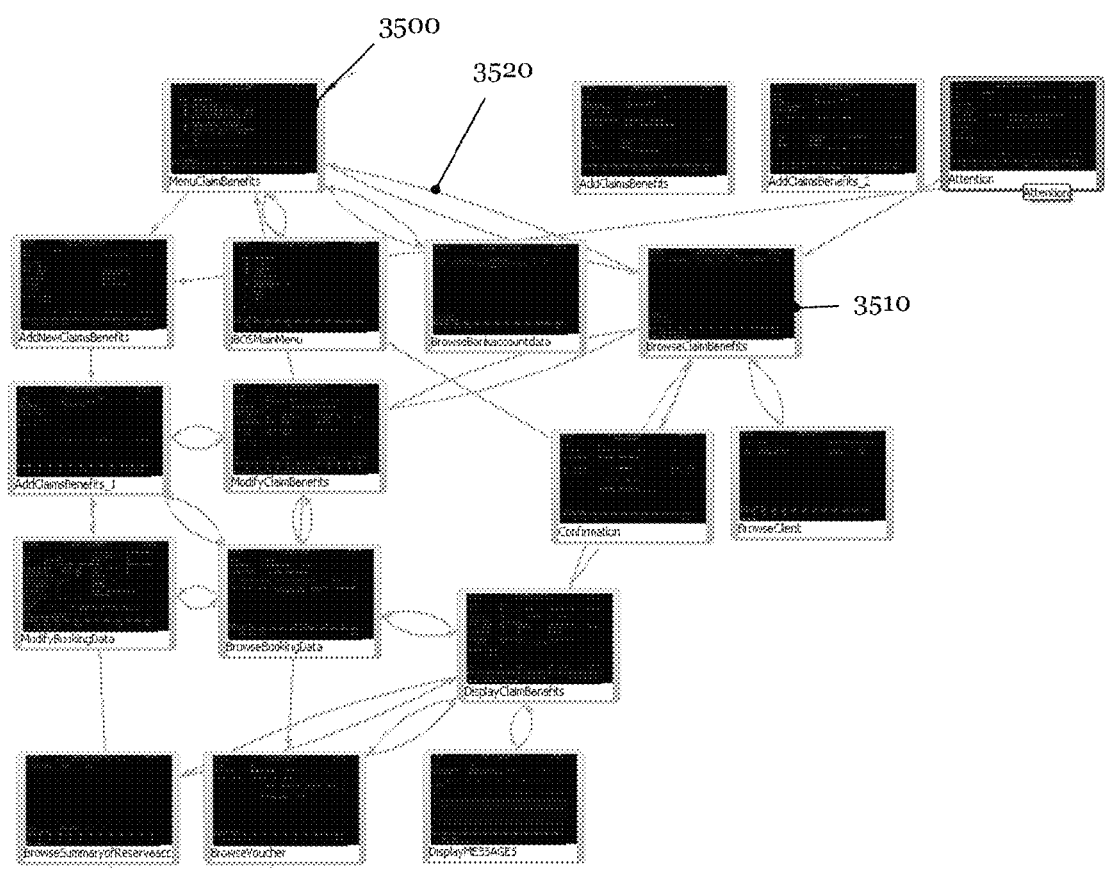
Figure 5:
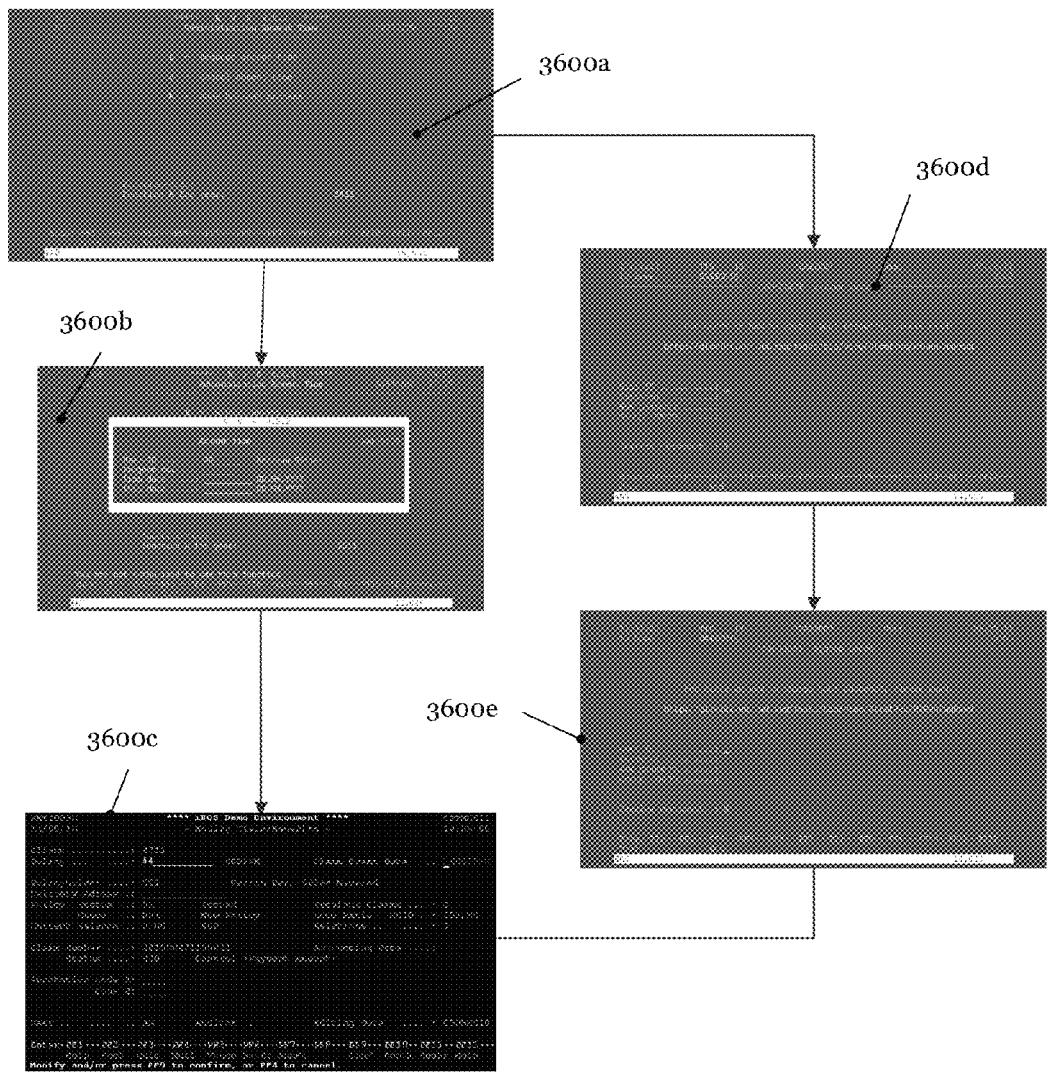
Figure 6:
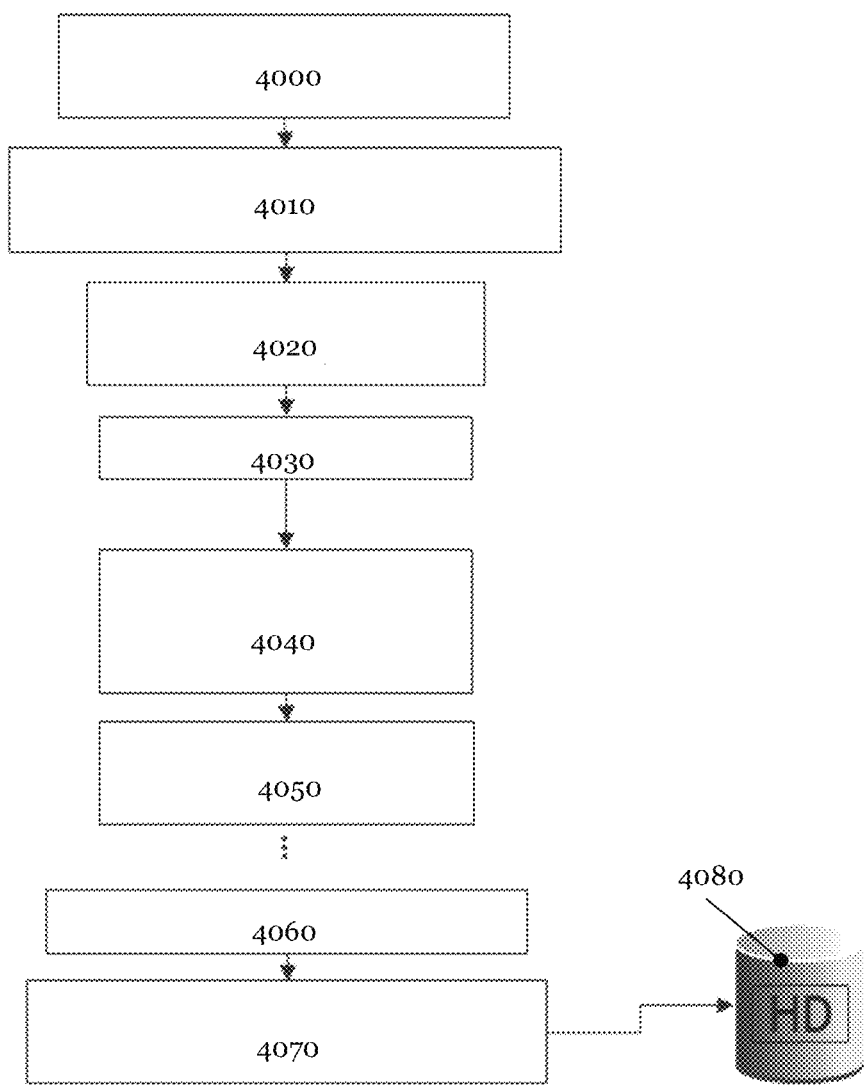
Figure 7:
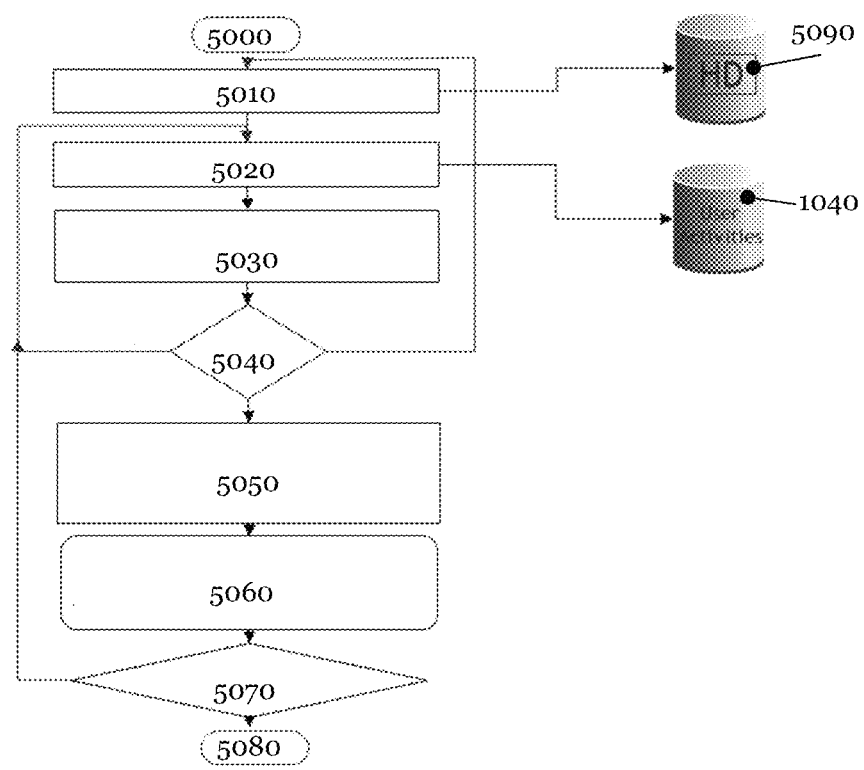
Figure 8:
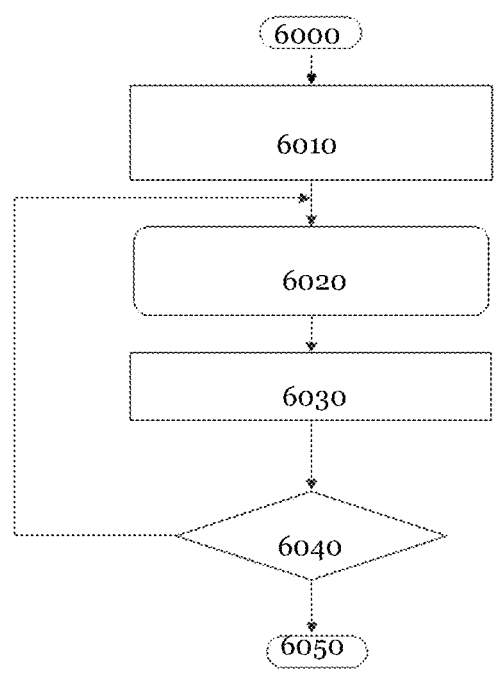
Figure 9:
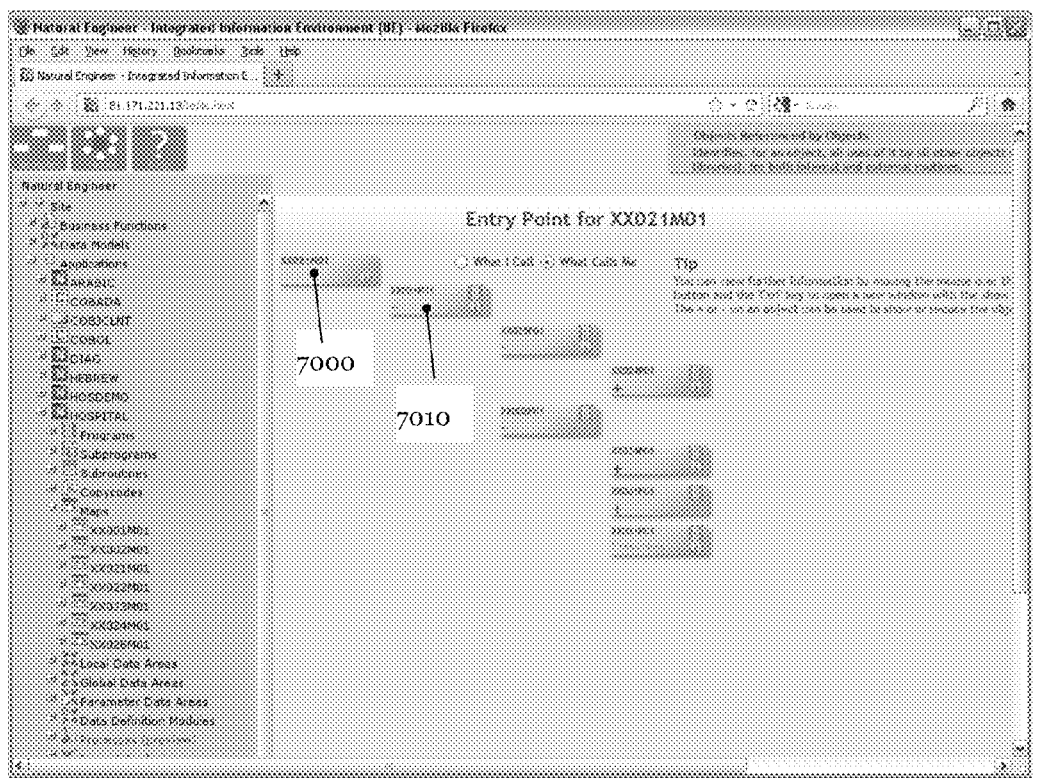
Figure 10:
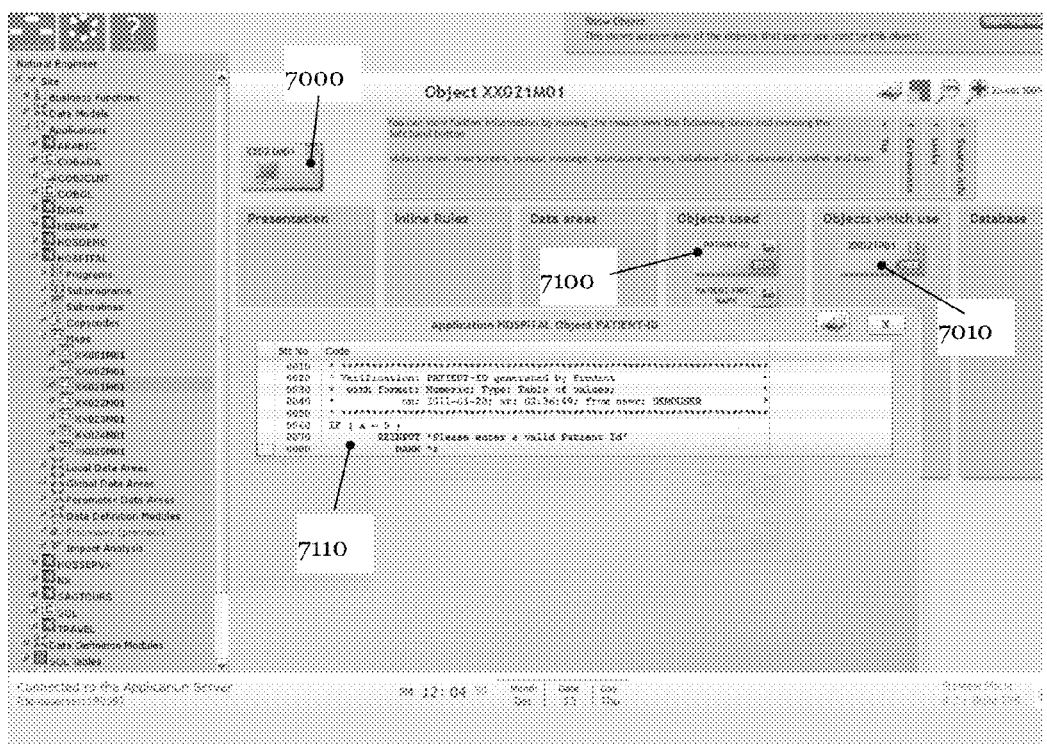

In the following detailed description, presently preferred embodiments of the invention are further described with reference to the following figures, wherein:

FIG. 1: illustrates the whole process for analyzing an instance of the process in a network environment according to an exemplary embodiment of the present invention;

FIG. 2: illustrates the proxy usage for monitoring the data exchange between a client and a legacy application running on a host system;

FIG. 3: illustrates the definition of an end-user activity in accordance with an exemplary embodiment;

FIG. 4: illustrates an example of an application map in accordance with an exemplary embodiment;

FIG. 5: illustrates an example of a end-user activity in accordance with an embodiment;

FIG. 6: illustrates the recording process of an end-user session in accordance with an exemplary embodiment;

FIG. 7: illustrates the discovery of a process as executed by an end-user in accordance with an embodiment of the present invention;

FIG. 8: illustrates a flow of the examination of a rule in accordance with an embodiment of the present invention;

FIG. 9: illustrates an example of different maps in accordance with an embodiment of the present invention; and FIG. 10: illustrates an example of a rule determination in accordance with an embodiment of the present invention.

5. DETAILED DESCRIPTION OF THE FIGURES

As mentioned above, the monitoring and maintenance of processes and instances thereof is a complex technical task which requires a lot of work during the whole lifecycle of the processes. A process as referred to herein comprises a sequence of activities. Each activity comprises one or more screens. Each screen may comprise one or more maps. A map defines the screen layout and comprises formatting instructions. The map may further define input fields and output fields and assigns program variables to the fields. A map may be used to identify a certain screen. The term sequence does not restrict the order in which screens may be displayed. The term lifecycle as used herein comprises the steps of the definition of the process, the repeated execution of instances of the process by end-users and the monitoring and modification of the process. Without a detailed and consistent definition of the process, the execution of the process is not well-defined and may violate policies, e.g., ensuring the safety of the work piece to be assembled. In order to leverage such policies in a process and in instances of the process, respectively, rules have to be defined. In other words, rules are implementations of a policy, e.g., defining a certain quality standard. It is also noted that any types of processes may be analyzed and modified according to the embodiments of the present invention. In particular, the invention not only relates to technical processes, such as assembling a car, but also to business processes, such as processing an order of a car.

FIG. 1 illustrates an overview over the architecture of the invention according to an exemplary embodiment. The respective steps for implementing the present invention in accordance with exemplary embodiments are described in more detail with reference to the following figures.

According to FIG. 1, end-users initiate one instance or multiple instances of a process on a client computer. An instance of a process initiated by an end-user is referred to as end-user session 1000. Typically, the legacy application 1020 executing the end-user session 1000 runs on a remote host computer system (e.g., a mainframe). The client computer and the remote host computer may communicate via network communication paths 1140, 1150. In the depicted example, the client computer and the remote host computer communicate via proxy 1010. The proxy 1010 is adapted to monitor all or part of the data exchanged between the client computer and the host computer via communication paths 1140, 1150. Known network communication protocols comprise the telnet protocol (e.g., TN 3270, TN 5250) or any other type of protocols known from the prior art. The connection may also be secured or encrypted. The access to the host computer may be gained through terminals or terminal emulation software. Further, the communication may also occur via wireless network means, e.g., mobile cellphones comprising transceivers. It is also preferred that the client computer runs not only an instance of the process but also the legacy application itself, i.e., only one computer is required. Even though the general architecture of an exemplary embodiment of the present invention has been described with reference to a single host computer and a single client computer, it is also conceivable to use multiple client computers and multiple host computers. In this case, the proxy may be adapted to monitor a plurality of connections.

According to the embodiment described with reference to FIG. 1, the end-user session 1000 is recorded and stored to the end-user session recording repository 1030. The session gets stored by saving (e.g., on 3270/5250 protocol level) screens, received from the host and the end user key strokes sent from the client to the host and vice versa. However, it is also possible that any number of end-user sessions 1000 is recorded and stored in this context. This may be done by screen process extractor 1005.

As an example, the end-user session 1000 could be stored in a trace file format which has the extension GCT. The GCT file format is a proprietary Software AG file format. It contains the whole terminal communication protocol between client and host. To make it readable for human beings and programs, it contains both encodings, ASCII and EBCDIC (Extended Binary Coded Decimals Interchange Code). In a further exemplary embodiment, the stored data may be com-pressed and encrypted. However, the invention is not to be limited to this particular file format.

To be able to analyze the instance of the process or a part thereof, it must be determined to which process out of a number of processes the recorded end-user session 1000 refers. This may be done by process activity discovery module 1080 which retrieves pre-defined activities from end-user activity repository 1040. Process activity discovery module 1080 then identifies one or more activities in end-user session 1000 in order to determine the process underlying the end-user session 1000 and therefore the recorded instance of the process. If an activity was found in the end-user session 1000, data relating to the respective screen or screens is stored. If only a part of the end-user session 1000 can be linked with one or more activities it is also possible to analyze only this portion of the end-user session 1000.

After process activity discovery module 1080 has determined which pre-defined process or activity corresponds to the recorded end-user session 1000, rule examination module 1090 may be utilized for determining the correlation between activities, single screens or maps used throughout execution of the end-user session 1000 and the underlying source code (e.g., comprising rules, functions or identifiers thereof) or parts thereof.

To this end, rule examination module 1090 communicates with software engineering tool 1070 via interface 1060. The software engineering tool 1070 could be any tool suitable for developing software on a mainframe. The tool may comprise a source code repository 1050, a repository which contains the call structure and/or dependency diagrams of maps, software methods and rules, which are either contained in the program source code or in the map definition itself. The tool should also allow to run automated dependency tracking. One example of such software is Natural Engineer of applicant. The interface 1060 may be implemented using different programming paradigms such as an object oriented or a functional approach. Programming languages such as Java, C++ or C, or others may be used. Preferably, the programming language is compatible to the software engineering tool 1070.

An example of the interface 1060 when implemented in Java could look like follows:

```
public class ExamineRuleClass {
public String QueryRuleFromDatabase(String mapname,
String fieldname)
{
// get Rule from database
String ruleName = QuerySDKRepository(mapname,
fieldname);
return ruleName;
}
}
/* sample instantiating ExamineRuleClass and provide
parameters map name and field name to get the rule
name if there is any rule related to the field on the
map.
ExamineRuleClass examineRule = new
ExamineRuleClass( );
String rule =
examineRule.QueryRuleFromDatabase("MapAddCustomer",
"FieldCustomerAge");
if (rule.lenght( ) > 0)
{
// rule is available
}
*/
```

In the above example, the program which is instantiating the class and calling the method QueryRuleFromDatabase( ) has to provide two parameters (map name and field name) to retrieve the rule name. A similarly implemented class (not provided here) would provide the program name of the legacy application which is calling the map.

In more detail, the rule examination module 1090 provides the software engineering tool 1070 with information about single screens, which have been identified previously by the process activity discovery module 1080.

In the above example, the implementation of the method ExamineRuleClass:QuerySDKRepository depends on the software engineering tool 1070. The query has to be specified depending on how the dependency between maps, rules and programs are stored in the repository.

The software engineering tool 1070 then determines the source code (e.g., rule, name of function, etc.) underlying the respective screen by querying the source code repository 1050. The source code to be determined may only relate to a part of the screen, which means certain input fields used therein. Instead of retrieving the source code as such it may also be sufficient to retrieve an identifier of the source code. This could be the name of a function which references fields in a map. It is also possible that the query results in one or more pointers to the source code that enables the software engineer to identify and/or find the respective portion of the source code. The result may also indicate the name of a certain rule. The names of rules are also unique and thus allow for an unambiguous identification of parts of a screen.

Then, rule examination module 1090 retrieves the source code (or parts thereof) corresponding to the data provided to the software engineering tool 1070. The above source code illustrates an exemplary implementation. As a result, rule examination module 1090 outputs the recorded screens, maps or fields 1120, or an identification thereof (e.g., a title of the screen) and the corresponding identifier 1130, i.e., source code, function, pointer or other suitable link. In this way it is possible to identify a rule and/or to determine its location in the source code. It is also preferred that several screens could be processed and displayed in parallel. In this way, an analyst analyzing the instance of the process can easily determine which portions of source code correspond to the process or parts thereof and communicate this information to the software engineer. Thereby, maintaining processes and source code becomes more efficient and safer.

In an exemplary embodiment it is also possible to display the result 1110 of the process activity discovery which was carried out by process activity discovery module 1080 without a determination of the source code, i.e., without employing rule examination module 1090.

With reference to FIG. 2, the usage of proxy 1010 will now be described in accordance with an exemplary embodiment. Client computer 2000 on which the end-user session 1000 is executed communicates with the legacy application on host system 2030 via network path 2010. In the depicted embodiment, the connection between the client computer 2000 and the host system 2030 utilizes the telnet protocols 3270/5250 and 9750/6530. Telnet server 2020 on host system 2030 coordinates the communication 2010. Proxy 1010 monitors at least a part of the data exchanged between the client 2000 and host system 2030. The monitoring performed by the proxy may be conducted in a transparent or at least non-intrusive manner. This assures the data transport between client computer 2000 and host system 2030 is only insignificantly influenced. The monitored data exchanged between client computer 2000 and host system 2030 will be stored with the help of a recorder 2040 comprised in the proxy 1010 and wherein the recorder 2040 is adapted to record the monitored data flows and to store the data to storage means 2050. In an exemplary embodiment, recorder 2040 may also record time stamps relating to the data flow and all kinds of connection information, e.g., host type and other metadata that could by relevant for analyzing the instance of the process corresponding to the end-user session 1000.

With reference to FIG. 3, the creation of an activity that may be used for building a process that is later to be used by end-users will now be described in accordance with an exemplary embodiment. In order to define an activity, an experienced user or the analyst executes the activity as it should be executed by end-users later on. In step 3000, the proxy 1010 records the user session of the analyst. It is also possible that a plurality of user sessions is recorded for activity definition. The recorded user session(s) is/are then stored in file repository 3010. In order to define the activity, the stored user session(s) is/are read out 3020 and it is checked whether for the recorded session already a map (e.g., a Natural map) exists, step 3030. As explained above, a map may be used to identify a screen. If such map exists, the respective screen is automatically identified based on screen definitions (e.g., BMS, MFS or Natural map screen definitions), step 3040.

The file formats BMS and MFS are IBM industry standard file formats. Basic mapping support (BMS) is an interface between CICS and application programs that formats input and output display data and routes multiple-page output messages without regard for the control characters that various terminals use. The BMS map set definition is a set of macros that contain the definitions of the map. Macros consist of operands that you can use to define the characteristics of the map or maps that make up the map set. The BMS map set definition summary page lists the BMS map set definitions that are in the inventory, the type of each, and the source location of the definition. Message Format Service (MFS) edits input data from a device into an IMS™ application message format using the message definition that the MFS application designer writes as input to the MFS language utility program. An input message consists of all segments presented to an IMS application program when the program issues a Dill GU or GN call. MFS edits output segments created by an IMS application program into a device format suitable for the device or remote program for which the message is destined. IMS provides message formatting functions for MFS. The control blocks format messages for different device types. The Natural map screen definition is a Software AG proprietary definition.

If no screen definition exists, the respective screen has to be identified semi-automatically in step 3050. To this end, a specific text area on the screen has to be defined (e.g., by screen position) to grab the text from the screen, which then will be used to automatically name the screen. To safely identify the screen using the text as mentioned above, it may also be required to define the field type. Possible field types are "protected", "hidden", "intensified" or "reverse video". These field types are defined in the IBM 3270 protocol definition.

In step 3060 a so called application map will be automatically created from the recording. This map shows all or a part of the screens the user has used to enter data or view data in the order of usage. The application map also shows the key strokes to get from the previous screen to the next. An example of an application map is shown in FIG. 4. With respect to FIG. 4, a first screen 3500 may serve as starting point. From screen 3500, another screen 3510 may be called using a certain key stroke 3520. In this way it is possible to construct complex application maps.

After creating the application map, the complete activity may be defined, step 3070. The definition of the activity comprises the definition of the screen flow, i.e., which screens were used and in which order, and the key strokes to be carried out.

Thereafter, in step 3080, the screen fields have to be (manually) mapped to process event attributes. As used herein, an event is an instance of an activity. For instance, ARIS PPM defines different categories of event attributes. In this example there are attributes which are required (as a minimum) for ARIS PPM. These attributes assure that the as-is-processes can be discovered and is also required to let ARIS PPM do some minimum performance analysis. These so called required event attributes have to be filled with appropriate data which is relevant to the process, exclusively taken from screen fields.

That is done in step 3080 by extracting the process data using a mapping definition from the recordings of the Screen Process Extractor which were stored by the proxy 1010 in the repository 3010. Before that, the mapping definition may be manually created, e.g., by the analyst during development time in step 3090 and stored to end-user activities repository 1040. An example of an screen-based end-user activity as it could be stored in end-user activities repository 1040 in accordance with an exemplary embodiment of the present invention is shown in FIG. 5, wherein screens 3600*a-d* are shown as well as an order in which the screens 3600*a-d* may be called. The order in which screens are used (displayed in FIG. 5), faithfully describes a process step undertaken during an instance of an activity.

End-user sessions 1000 have to be recorded to be able to analyze them. This is described with reference to FIG. 6. The user starts a legacy application session in step 4000. The proxy then monitors at least a part of the data transmitted between the client computer and the host system. This data is recorded to a memory, step 4010. During the execution of the instance of the process, the host system may also send data to the client computer, step 4020. This data may comprise the screens to be filled out. This data transfer is also recorded by the proxy, step 4030. The user fills information into the screens (e.g., by inserting text), step 4040. This data is also stored to memory, step 4050. After finishing the end-user session 1000, the end-user closes the end-user session 1000 at the host computer, step 4060 and the proxy adds the recorded data to the repository on a hard disc 4080 in step 4070.

In order to monitor an instance of the process and to identify source code underlying at least a part of the process or an activity comprised in the process, the end-user session 1000 has to be identified, i.e., it has to be determined whether the recorded end-user session 1000 or a part thereof is defined and is available in the user activity repository 1040.

The process discovery is described with reference to FIG. 7. The discovery process 5000 starts with reading out 5010 an end-user recording from end-user session recording repository 5090. Thereafter, a first activity definition is read out from user activity repository 1040 in step 5020. In step 5030 it is determined whether a part of the end-user recording matches with the first activity definition of the user activity repository 1040. Depending on whether a match has been found, in step 5040 the method either proceeds with reading out a next user activity definition, i.e., the method returns to step 5020, or stores the results to memory. This could comprise storing process event attribute information to an event XML file, step 5050. Thus, it becomes possible to monitor the instance of the process or a part thereof, e.g., to determine whether it was executed correctly or whether there were problems or errors during execution of the instance of the process.

As explained above, during the definition of the process or activity, the screen fields were mapped to process event attributes. After the process or an activity thereof has been identified, the single screens called during the execution of the activity by the end-user are known. Thus, it is now possible to determine which functions in the screens were used, e.g., which fields of a screen were used and what the underlying rules and the corresponding portions of source code are. This corresponds to step 5060, which will be described in more detail below with respect to FIG. 8. This operation is carried out until all user recordings and/or user activities are scanned, step 5070. The process discovery stops in step 5080.

FIG. 8 illustrates a process 6000 of rule examination in accordance with an embodiment. In step 6010, the call parameters used to examine the rules are prepared. As mentioned before, the screens used in the instance of the process and/or activity have already been determined. Thus, the fields of the respective screen are known. Based thereon, a call may be prepared, e.g., as an array, comprising the name of the map and the fields comprised therein: Array[MapName, FieldName]. In step 6020, a function may be called which communicates with the software engineering tool interface in order to acquire the source code or a reference to the source code underlying the respective fields of the maps and thus to the rules. The source code or name of functions identifying the source code are then retrieved and stored to memory, step 6030. This information may also comprise a short description of the source code or the function identifying the source code. After all entries of the array have been scanned 6040, the method ends in step 6050.

As an example, FIGS. 9 and 10 illustrate the determination of a rule and related program name based on an identified screen. With respect to FIG. 9, the legacy application which is maintained using the software engineering tool 1070, may comprise a map 7000. This map may be called from program 7010. FIG. 10 shows a rule 7110, which belongs to the map 7000. This rule is applied during runtime of the legacy application after the user has entered data to the field "Patient-ID" 7100. Both figures (FIG. 9 and FIG. 10) describe a sample for a correlation between a map, rules and certain programs in a legacy application. With the help of the software interface 1060, the described method allows the analyst to determine the rule name and program name, if needed, which may be related to certain screens belonging to an activity. Both names are returned as the result of the implemented query. The names may be extracted based on the dependency information stored in the repository 1050. Once the analyst has obtained the rule name 7110, he can convey it to the software engineer, who now can carry out modifications to the rule and/or program. The software engineer then could easily determine the place in the source code to be modified in the software engineering tool.

According to an embodiment, the analysis of the instance of the process as described above may also be carried out online, i.e., during runtime of an end-user session 1000. This allows for a faster analysis of instances of processes during runtime. In this way it becomes possible to react more quickly when changes to rules and code are needed or to resolve problems.

It will be appreciated that as used herein, the terms system, subsystem, service, module, programmed logic circuitry, and the like may be implemented as any suitable combination of software, hardware, firmware, and/or the like. It also will be appreciated that the storage locations/repositories herein may be any suitable combination of disk drive devices, memory locations, solid state drives, CD-ROMs, DVDs, tape backups, storage area network (SAN) systems, and/or any other appropriate non-transitory tangible computer readable storage medium. It also will be appreciated that the techniques described herein may be accomplished by having at least one processor execute instructions that may be tangibly stored on a non-transitory computer readable storage medium. Similar statements apply with respect to the clients, servers, and/or other elements (such as, for example, the various extractors, units, modules, etc.) in the various networks discussed herein.

What is claimed is:

1. A computer-implemented system for analyzing an instance of a process being executed in a network environment that includes an electronic communications network, the computer-implemented system comprising:
   a host computer system configured to execute a legacy application program and transmit, via the electronic communications network that is part of the network environment, first data based on execution of the legacy application program, the execution of the legacy application program including execution of an instance of a process that a user interacts with through a screen-based user session;
   a client computer system coupled to the host computer system via the electronic communications network, the client computer system configured to:
      receive, via the electronic communications network, the first data transmitted from the host computer system,
      display, based on the received data, screens of the screen-based user session of the instance of the process on a display device that is coupled to the client computer system, and
      communicate second data to the host computer system for processing by the legacy application, the second data based on input provided to the client computer system;
   a non-transitory storage medium system configured to store a source repository that includes source code of the process;
   a processing system that includes at least one processor, the processing system configured to:
      monitor at least a part of the communicated second data;
      determine, based on the monitored second data, at least a part of the screen-based user session of the instance of the process while the instance of the process is being executed;
      store the extracted part of the screen-based user session of the instance of the process to a recording repository in the non-transitory storage medium system; and
      map, based on execution of a query, at least a part of the stored screen-based user session to a particular portion of the source code that corresponds to the executed instance of the process; and
   a display device coupled to the processing system, the display device configured to display results, which are based on the query executed, including at least a part of the screen-based user session and at least a part of the corresponding source code underlying the screen-based user session.

2. The computer-implemented system according to claim 1, wherein the processing system is further configured to identify source code corresponding to a specific part of the stored screen-based user session.

3. The computer-implemented system according to claim 2, wherein the results of the query related to the identification of the source code are stored in a repository.

4. The computer-implemented system according to claim 2, wherein the source code is identified by a pointer to and/or an indication of the name of a function in the source code.

5. The computer-implemented system according to claim 2, wherein the processing system is further configured to detect additional screens using source code that was mapped and not used during the execution of the instance of the process.

6. The computer-implemented system according to claim 1, wherein the monitored data is further linked with connection information and/or a time stamp.

7. The computer-implemented system according to claim 1, wherein the map of the at least a part of the stored screen-based user session to the source code is executed after the instance of the process has finished.

8. The computer-implemented system according to claim 1, wherein the non-transitory storage medium system is further configured to store a process repository containing the process at least in part,
wherein the processing system is further configured to determine a discrepancy between the process and the instance of the process as extracted.

9. The computer-implemented system according to claim 8, wherein the processing system is further configured to determine when a part of the source code underlying the extracted screen-based user session was changed for the last time.

10. The computer-implemented system according to claim 1, wherein the processing system is further configured to extract an order in which keys were pressed and screens were displayed during runtime of the instance of the process.

11. The computer-implemented system according to claim 1, wherein the process includes a sequence of activities.

12. A computer-implemented method for analyzing an instance of a process in a network environment that includes an electronic communications network, the electronic communications network coupled to a host computer system and a client computer system the computer-implemented method comprising:
executing, on the host computer system, an instance of a process, which is part of a legacy application program executed on the host computer system, that a user interacts with through a screen-based user session;
transmitting, via the electronic communications network that is part of the network environment, first data based on execution of the instant of the process;
receiving, at a client computer system and via the electronic communications network, the first data transmitted from the host computer system;
displaying, based on the received data, screens of the screen-based user session of the instance of the process on a display device that is coupled to the client computer system,
causing second data to be communicated to the host computer system for processing by the legacy application, the second data based on input provided to the client computer system while the screens of the screen-based user session are displayed;
monitoring at least a part of the communicated second data;
determining, based on the monitored second data and by using a processing system that includes at least one processor, at least a part of the screen-based user session during runtime of the instance of the process;
storing the at least a part of the screen-based user session to a recording repository;
storing at least a part of the source code underlying the process corresponding at least in part to the instance of the process in a source code repository;
mapping, by using a query executed by a processing system that includes at least one processor, the stored screen-based user session to the source code that corresponds to the executed instance of the process; and
displaying, to a display device that is coupled to the processing system, results, which are based on the executed query, including at least a part of the screen-based user session and at least a part of the corresponding source code underlying the screen-based user session.

13. A non-transitory computer readable medium tangibly embodying machine executable instructions for use with a computer system that is used to analyze an instance of a process in a network environment that includes an electronic communications network coupled a host computer system and a client compute system, the host computer system configured to execute a legacy application program and transmit, via the electronic communications network, first data based on execution of the legacy application program, the execution of the legacy application program including execution of an instance of a process that a user interacts with through a screen-based user session, the client computer system configured to (1) receive, via the electronic communications network, the data transmitted from the host computer, (2) display, based on the received data, screens of the screen-based user session of the instance of the process on a display device that is coupled to the client computer system, and (3) communicate second data to the host computer system for processing by the legacy application, the second data based on input provided to the client computer system; the machine executable instructions comprising instructions configured to cause the computing system to:
monitor at least a part of the communicated second data;
determine, based on the monitored second data, at least a part of the screen-based user session during runtime of the instance of the process;
store the at least a part of the screen-based user session to a recording repository;
store at least a part of the source code underlying the process corresponding at least in part to the instance of the process in a source code repository;
map, as part of execution of a query, the stored screen-based user session to the source code that corresponds to the executed instance of the process; and
display results, which are based on the query executed, including at least a part of the screen-based user session and at least a part of the corresponding source code underlying the screen-based user session.

* * * * *